United States Patent [19]

Hopkins et al.

[11] Patent Number: 4,645,401
[45] Date of Patent: Feb. 24, 1987

[54] MAGNETIC DISC HANDLING SYSTEM

[75] Inventors: Allen B. Hopkins, Baldwinville, Mass.; John P. Dockx, Hooksett, N.H.

[73] Assignee: Disc Technology Corporation, Billerica, Mass.

[21] Appl. No.: 620,116

[22] Filed: Jun. 13, 1984

[51] Int. Cl.⁴ .......................................... B65G 65/34
[52] U.S. Cl. ............................ 414/222; 198/419; 198/803.12; 414/180; 414/416; 414/749; 414/908
[58] Field of Search .............. 414/27, 160, 172, 180, 414/416, 787, 911, 908, 222, 417, 910, 749; 198/419, 431, 487.1, 803.12; 118/729

[56] References Cited

U.S. PATENT DOCUMENTS

| | | | |
|---|---|---|---|
| 2,139,553 | 12/1938 | Little | 414/27 X |
| 3,240,356 | 3/1966 | Hill | 414/27 |
| 3,702,138 | 11/1972 | Abrahamsson et al. | 414/787 X |
| 3,905,485 | 9/1975 | Shumaker | 414/911 X |
| 4,290,734 | 9/1981 | Van Breen | 414/787 X |
| 4,306,826 | 12/1981 | Detwiler | 414/27 |
| 4,354,603 | 10/1982 | Dunn | 414/787 X |

FOREIGN PATENT DOCUMENTS 846917 8/1952 Fed. Rep. of Germany ...... 414/180
0098403 6/1982 Japan ................................ 414/416

Primary Examiner—Joseph E. Valenza
Assistant Examiner—David A. Bucci
Attorney, Agent, or Firm—Weingarten, Schurgin, Gagnebin & Hayes

[57] ABSTRACT

A system for loading and unloading of magnetic discs into and out of a processing chamber in a manner to provide and maintain the discs in spaced positions from each other. A quantity of discs are contained within respective slots of a cartridge carrier movable between first and second positions. In a first position a tubular mandrel is inserted through the aligned central openings of the discs within the cartridge, the mandrel having spaced circumferential grooves spaced correspondingly with the spacing between discs retained in the cartridge. The mandrel is inserted through the central openings of the disc with the respective grooves in alignment, and the cartridge is moved to its second position to leave the discs supported by the respective grooves of the mandrel. The mandrel with the discs supported thereon is inserted into a chamber for processing. Upon removal of the mandrel and discs carried therefrom from the processing chamber, an empty cartridge is moved to the first position and the mandrel is withdrawn from the discs to leave the discs retained within the cartridge carrier.

13 Claims, 12 Drawing Figures

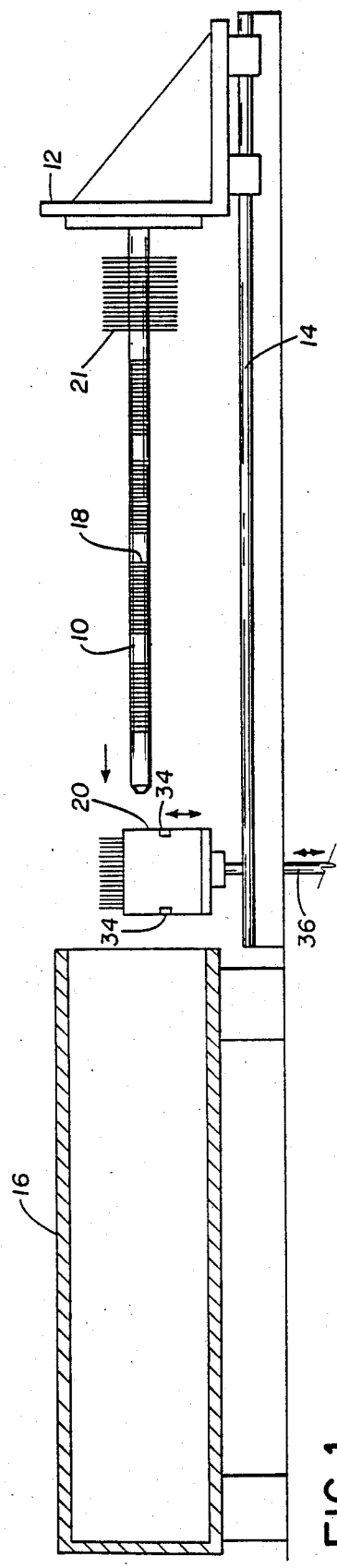
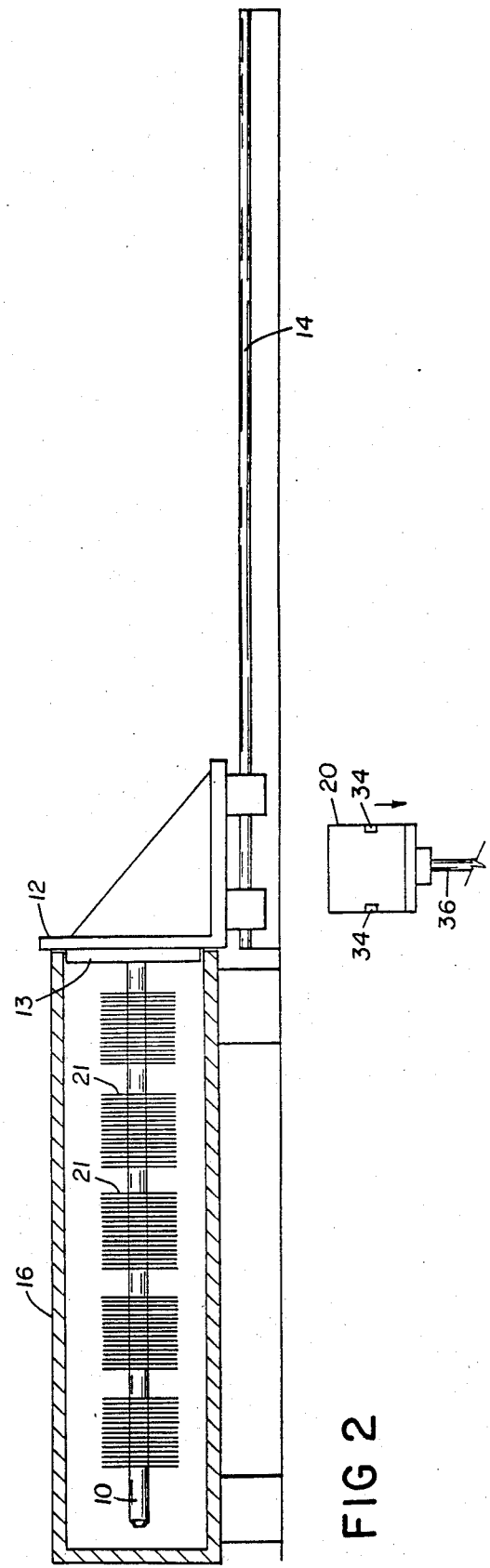
FIG 1
FIG 2

MAGNETIC DISC HANDLING SYSTEM

FIELD OF THE INVENTION

This invention relates to magnetic disc fabrication and more particularly to apparatus and techniques for the handling of magnetic discs during fabrication.

BACKGROUND OF THE INVENTION

In the fabrication of magnetic discs employed for the storage of digital data it is essential that the discs be handled in an extremely carefuly manner throughout the fabrication process in order to assure the provision of an acceptable product. The magnetic discs comprise an aluminum or other substrate in the shape of a disc with an accurately located central hole and highly finished surfaces on which a magnetic coating is provided and which serves as the magnetic storage medium for data which is to be written onto the disc or read therefrom. The surfaces of the substrate and coated surfaces must remain as free from dirt, contamination or physical damage as is commercially achievable, especially for magnetic discs capable of providing high density magnetic storage.

During the fabrication process it is usually necessary to transfer discs after a particular processing operation to a subsequent station for further processing. For example, the discs after coating with a magnetic material are usually transferred to a furnace for baking of the coating to achieve intended characteristics. Another process involves the transfer of coated discs into a drying chamber. One technique that is known for handling magnetic discs utilizes a removable hub which is fitted into the opening of each disc substrate and locked thereto, the hub having a central hole by which the hub and the disc carried thereon is inserted onto a mandrel. A plurality of discs with such removable hubs are similarly installed on a mandrel, and the mandrel is then conveyed into the furnace or processing chamber for processing. This technique is time consuming and expensive and requires the use of labor for manually installing each hub on each respective disc and then installing the hub and disc assembly onto the mandrel. In addition, after processing the disc and hub assemblies must be manually removed from the mandrel and the hub then removed from the disc.

Disc handling apparatus is shown in U.S. Pat. Nos. 4,290,734 and 4,354,603 which include an elongated member having a mechanism therein for moving spaced discs along the length of the member.

SUMMARY OF THE INVENTION

In accordance with this invention an automatic system is provided for the loading and unloading of magnetic discs into a processing chamber in a manner to provide and maintain the discs in spaced positions from each other and without the necessity for any ancillary hardware or fixtures for retaining the discs in position. A quantity of discs are contained within respective slots of a cartridge or carrier. The cartridge is moved to a position at which a tubular mandrel is inserted through the aligned central openings of the discs retained by the cartridge, the mandrel having a plurality of spaced circumferential grooves spaced correspondingly as the spacing between the discs as installed and retained in the cartridge. The mandrel is inserted through the central openings of the disc with the respective grooves alignment with respective discs, and the cartridge is then withdrawn from the discs to leave the discs supported by respective grooves of the mandrel. Each disc is therefore spaced from the adjacent discs so that the discs do not touch one another during handling. The mandrel with the discs supported thereon is inserted into the chamber for processing. A plurality of mandrels can be employed within the same processing chamber so that a large quantity of discs can be processed in a single chamber at one time.

After processing the mandrel is withdrawn from the chamber to a position at which the discs carried by the mandrel are in alignment with the respective slots of a cartridge. The cartridge is then moved into engagement with the discs and the discs are moved out of engagement with the mandrel grooves, and the mandrel is then withdrawn from the central openings of the discs which are now retained within the cartridge. In the case of a plurality of mandrels being employed, all of the mandrels can be moved in unison into and out of the processing chamber, or they may be moved sequentially or in groups less than the entire number.

DETAILED DESCRIPTION OF THE DRAWING

The invention will be more fully understood from the following detailed description taken in conjunction with the accompanying drawings in which:

FIG. 1 is a diagrammatic representation of a magnetic disc handling system in accordance with the invention, with the mandrel in a position outside a processing chamber;

FIG. 2 is a diagrammatic representation of a magnetic disc handling system in accordance with the invention with the mandrel in the processing chamber;

DETAILED DESCRIPTION OF THE INVENTION

Figure 6A:
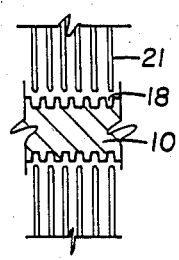
FIG. 6a is a cutaway sectional view of the mandrel with magnetic disc in alignment for retention.
Figure 6B:
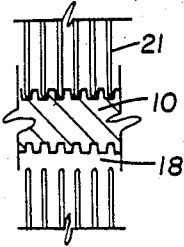
FIG. 6b is a cutaway sectional view of the mandrel with magnetic discs carried thereon.

A magnetic disc handling system in accordance with the invention is shown diagrammatically in FIGS. 1 and 2 and includes an elongated tubular mandrel 10 coupled to a drive head 12 which is horizontally slidable along a bed 14 for moving the mandrel and cartridges carried on the mandrel into and out of a processing chamber 16. The mandrel has a plurality of spaced circumferential grooves 18 disposed along at least a portion of the length thereof. The mandrel is of a diameter slightly smaller than the diameter of the central opening of magnetic discs to be carried thereon and each groove is of a width to accommodate a respective disc as shown in FIGS. 6a and 6b. The grooves are spaced by an amount to maintain an intended spacing between adjacent discs so that the discs cannot touch each other during handling. The mandrel is typically fabricated of stainless steel and can include a central opening in the mandrel throughout the length thereof so that the mandrel can be fabricated from standard tube stock. The mandrel is of a length sufficient to accommodate an intended quantity of discs.

In the illustrated embodiment, the mandrel 10 is of sufficient length to hold five cartridge loads of discs. Successive cartridge carriers can be moved to a single loading/unloading station, and the mandrel can be moved axially to respective positions for loading and unloading of the respective supplies of discs. Alternatively, a plurality of carriers can be provided at respective stations and can be loaded and unloaded in unison.

Figure 4:
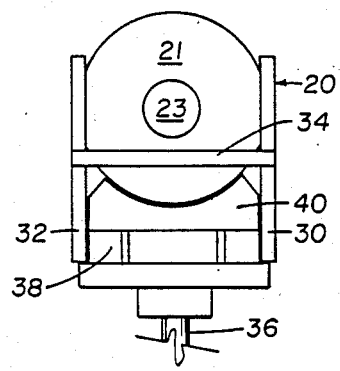
FIG. 4 is an elevation view of the cartridge carrier employed in the invention.
Figure 8:
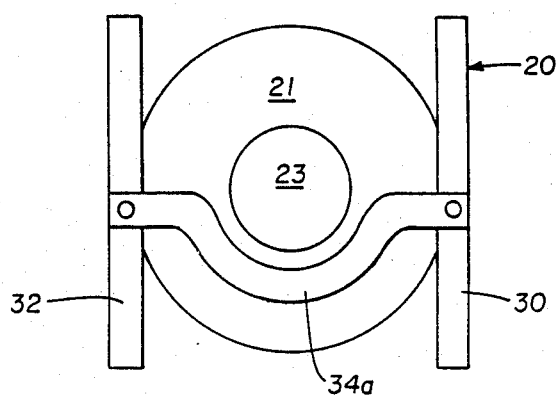
FIG. 8 is an elevation view of an alternate cartridge carrier which can be employed in the invention.

The cartridge carrier 20 is illustrated in FIG. 4 and is composed of a pair of parallel side walls 30 and 32 interconnected by a cross-brace 34 on respective opposite edges of the sides. The sides 30 and 32 each include parallel grooves therein sized to accommodate the discs 21 in spaced relationship. The grooves in the side walls 30 and 32 extend approximately midway down the height of the side walls to retain the discs substantially within the confines of the carrier. The grooves are spaced by the same amount as the spacing of the circumferential grooves in mandrel 10. The cartridge carrier is supported on a support mechanism 22 having a shaft 36 coupled to drive means suitable for raising and lowering the carrier between its first and second operative positions. The support mechanism 22 includes a plate 38 over which the side walls 30 and 32 of the carrier are fitted, and a plate 40 having an arcuate surface cooperative with the bottom sector of the discs 21 and which serves to raise the discs within the carrier grooves to a position at which the central openings 23 of the discs are above the cross-braces 34. In this raised position, the central openings 23 of the discs within the carrier are unobstructed to receive the mandrel 10 therethrough. An alternative cartridge carrier is illustrated in FIG. 8 and includes cross-braces 34a which have downwardly curved central sections which lie outside the area of the central openings 23. In this embodiment of FIG. 8, the discs remain in their fully inserted position within the carrier and do not have to be raised for accommodation of the mandrel.

Figure 5:
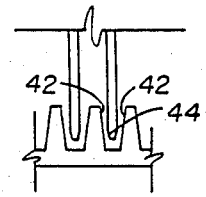
FIG. 5 is a cutaway sectional view of magnetic discs retained in respective grooves of the cartridge carrier.

The confronting walls 42 of the respective grooves of the cartridge carrier are tapered as illustrated in FIG. 5. The peripheral edge 44 of each disc 21 is chamfered such that the disc contacts the confronting groove walls of the cartridge carrier substantially only at this peripheral edge. The outermost peripheral portion of the magnetic coating on the discs is not employed for magnetic storage, and the operative surfaces of the magnetic coating on which magnetic storage is accomplished are not in contact with the groove surfaces of the carrier.

The confronting walls of the circumferential grooves of the mandrel are also inwardly inclined and contact substantially only the peripheral edge of the central opening 23 of the respective discs, so as not to contact the operative area of the magnetic recording surfaces.

Figure 3A:
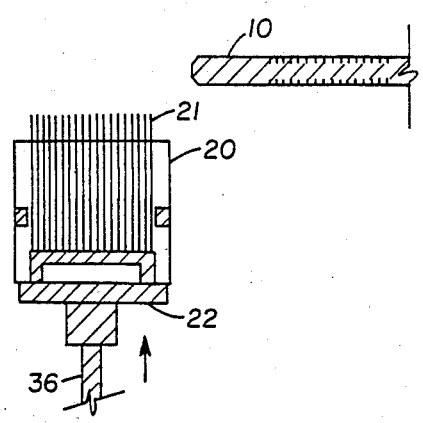
FIGS. 3a–3d are diagrammatic representations of the disc handling apparatus at successive steps of a handling cycle.
Figure 3B:
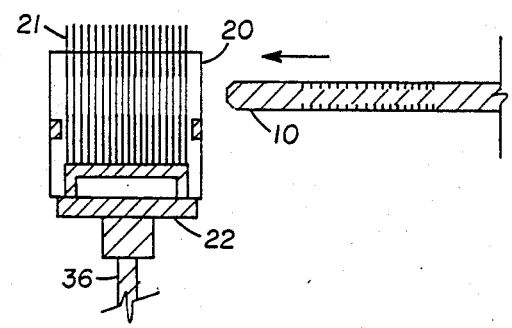
Figure 3C:
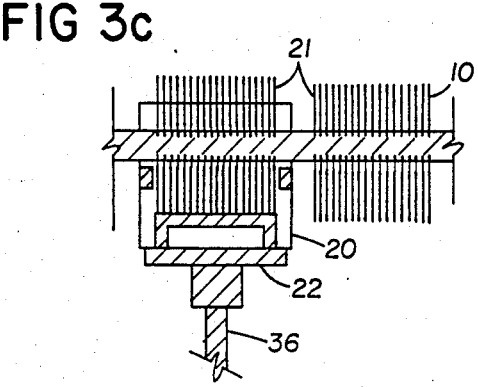
Figure 3D:
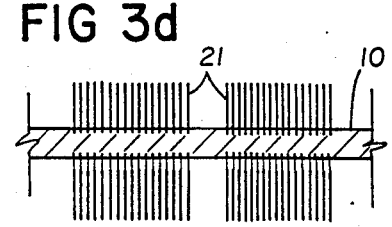

The operation of the system for loading of discs from the cartridge carrier onto the mandrel and thence into a processing chamber will be illustrated in conjunction with FIGS. 3a–3d. During the initial step of a loading cycle, a mandrel 10 carried by the drive head is in a position as illustrated in FIG. 3a, with a cartridge 20 containing a supply of discs 21 disposed outward and below the end of the mandrel in the second position, as illustrated. As shown in FIG. 3b, the cartridge 20 is moved to a first position in alignment with the mandrel 10. Next, the mandrel 10 is inserted through the central openings of the discs 21 carried by the cartridge 20, as shown in FIG. 3c, with the grooves of the mandrel in alignment with the respective discs, as seen in FIG. 6a. The cartridge 20 is then lowered to its second position as shown in FIG. 3d, to leave the discs 21 supported in respective grooves of the mandrel 10, as shown in FIG. 6b. The mandrel with the discs carried thereon is moved into the processing chamber, as shown in FIG. 2. The drive head 12 includes a member 13 which serves as a cover to seal the chamber 16. A plurality of mandrels each with its own supply of discs can be installed within a single processing chamber so that a large quantity of discs can be processed at one time within the chamber.

After processing is complete, the drive head 12 and the mandrel 10 with the discs carried thereon is withdrawn from the processing chamber 16 to a position in alignment with a cartridge then located in its second position, as shown in FIG. 3d. The cartridge is raised to its first position (FIG. 3c) to engage each of the discs within a respective groove of the cartridge carrier. The cartridge is raised to a slightly upward position in order to disengage the discs from the grooves of the mandrel, as seen in FIG. 6a, and the mandrel is then withdrawn to the position shown in FIG. 3b. The cartridge 20 and its supply of discs 21 is then lowered to the second position and manually or automatically removed from the handling system or transferred to subsequent processing apparatus.

Figure 7:
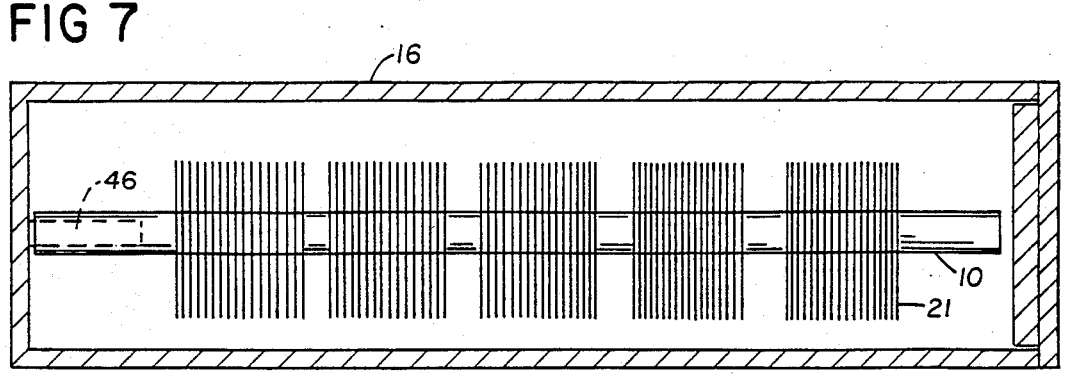
FIG. 7 is a diagrammatic representation of an alternative embodiment having a mandrel detachable from the drive head and retainable in the processing chamber.

Alternatively, the mandrel 10 can be detachable from its drive head 12, and the mandrel can be retained within a processing chamber, as illustrated in FIG. 7. The processing chamber in this embodiment includes a retaining pin 46 inwardly extending from the end wall of the chamber and onto which the mandrel is installed for retention within the chamber.

The invention is not to be limited by what has been particularly shown and described except as indicated in the appended claims.

What is claimed is:

1. A system for transferring magnetic discs to and from a processing chamber each disc having a central opening and a peripheral edge, comprising:

an elongated horizontal mandrel defining a longitudinal surface with a cross-sectional dimension smaller than the central opening so as to be insertable therethrough and having a plurality of circumferential grooves spaced therealong each of the grooves being adapted to receive the edge of the central opening and retain a respective magnetic disc, and the grooves being spaced to maintain the discs in spaced non-touching relationship along the mandrel;

a cartridge carrier having a plurality of grooves each having confronting spaced walls and adapted to retain a respective magnetic disc through contact between the confronting spaced walls of the groove and the disc's peripheral edge, the grooves of the cartridge carrier being spaced the same as the spacing of the grooves of the mandrel and operative to maintain the discs in spaced relation and with aligned central openings;

first driver means for imparting motion to the mandrel on a first path defined co-axially along the mandrel's longitudinal axis;

second driver means for imparting motion to the cartridge carrier on a second path defined along an axis transverse to the first path;

said second means being operative to move the cartridge carrier containing the discs into alignment with the mandrel;

said first means being operative to move the mandrel through the aligned central openings of the magnetic discs retained within the cartridge carrier, with each groove of the mandrel in alignment with a respective disc within the cartridge carrier;

said second means being operative to move the cartridge carrier out of engagement with the discs to leave the discs retained in respective grooves of the mandrel; and said first means being operative to move the mandrel and discs carried thereon into a processing chamber.

2. The disc handling system of claim 1 wherein:

said first means is operative to remove the mandrel containing the discs from the processing chamber to a position with the discs in alignment with respective grooves of the cartridge carrier;

said second means is operative to move the cartridge carrier into engagement with the discs carried on the mandrel, and to move the discs out of engagement with the respective grooves of the mandrel; and said first means is operative to withdraw the mandrel from the discs.

3. A system for transferring magnetic discs to and from a processing chamber each disc having a central opening and a peripheral edge, comprising:

an elongated horizontal mandrel defining a longitudinal surface with a cross-sectional dimension smaller than the central opening so as to be insertable therethrough and having a plurality of circumferential grooves spaced therealong, each of the grooves being adapted to receive the edge of the central opening and retain a respective magnetic disc, the grooves being spaced to maintain the discs in spaced non-touching relationship along the mandrel;

a cartridge carrier having a plurality of confronting grooves each having confronting spaced walls and adapted to retain a respective magnetic disc through contact between the confronting spaced walls of the groove and the disc's peripheral edge, the grooves of the cartridge carrier being spaced the same as the spacing of the grooves of the mandrel and operative to maintain the discs in spaced relation with aligned central openings;

first driver means for imparting motion to the mandrel on a first path defined co-axially along the mandrel's longitudinal axis to successive longitudinal positions;

second driver means for imparting motion to the cartridge carrier on a second path defined along an axis transverse to the first path and between successive positions along the second path;

said second means being operative to move the cartridge carrier containing the discs into alignment with the mandrel disposed along the longitudinal axis outward of the cartridge carrier;

said first means being operative to move the mandrel along the longitudinal axis through the aligned central openings of the discs within the cartridge carrier, with each groove of the mandrel being in alignment with a respective disc within the cartridge carrier;

said second means being operative to move the cartridge carrier along the transverse axis out of engagement with the discs to leave the discs retained in respective grooves of the mandrel; and said first means being operative to move the mandrel and discs carried thereon into a processing chamber.

4. The disc handling system of claim 3 wherein:

said first means is operative to remove the mandrel containing the discs from the processing chamber to a position with the discs in alignment with respective grooves of the cartridge carrier disposed along the transverse axis outward of the discs on the mandrel;

said second means is operative to move the cartridge carrier into engagement with the discs carried on the mandrel and to move the discs out of engagement with the respective grooves of the mandrel; and said first means is operative to withdraw the mandrel from the discs retained in the cartridge carrier.

5. The disc handling system of claim 3 wherein the second means is operative to move the cartridge carrier along the transverse axis between a first position with the central openings of the discs retained within the cartridge carrier in alignment with the mandrel, and a second position downward along the transverse axis.

6. The disc handling system of claim 3 wherein the grooves of the mandrel each have inwardly tapered side walls cooperative with the peripheral edge of the central opening of a disc carried in the groove to contact the disc substantially only at the peripheral edge.

7. The disc handling system of claim 3 wherein the grooves of the cartridge carrier each have confronting walls which are inwardly tapered and which are cooperative with the peripheral edge of a disc carried therein to contact the disc substantially only at the peripheral edge.

8. The disc handling system of claim 3 wherein the elongated mandrel is of a length sufficient to accommodate a quantity of discs from a plurality of cartridge carriers.

9. The disc handling system of claim 3 wherein said first means includes a horizontal bed defining a longitudinal travel path;

a drive head coupled to the bed and slideable along the bed in a forward and reverse direction;

said drive head including means coupled to an end of the mandrel horizontally extending outwardly from the head along the longitudinal axis.

10. The disc handling system of claim 3 wherein said second means includes a support mechanism for retaining the cartridge carrier thereon;

drive means coupled to the support mechanism and operative to raise and lower the support mechanism and the cartridge carrier thereon along the transverse axis.

11. The disc handling system of claim 10 wherein the support mechanism further includes means for raising the discs carried by the cartridge carrier retained on the support mechanism by an amount to provide unobstructed aligned openings of the discs within the cartridge carrier for insertion of the mandrel through the aligned openings.

12. The disc handling system of claim 9 wherein the drive head is detachably coupled to the mandrel.

13. The disc handling system of claim 12 wherein the processing chamber includes retaining means therein for retaining the mandrel with discs carried in the grooves thereof after detachment of the drive head from the mandrel.

* * * * *